Dec. 27, 1960 F. H. RAYMOND 2,966,666

MAGNETIC RECORD AND/OR PLAYBACK HEADS AND CONTROL ARRANGEMENT THEREFOR

Filed March 29, 1955

INVENTOR.
FRANÇOIS HENRI RAYMOND

BY [signature]

ATTORNEY 2,966,666
Patented Dec. 27, 1960

2,966,666

MAGNETIC RECORD AND/OR PLAYBACK HEADS AND CONTROL ARRANGEMENT THEREFOR

François Henri Raymond, Saint-Germain-en-Laye, France, assignor to Societe d'Electronique et d'Automatisme, Courbevoie, France Filed Mar. 29, 1955, Ser. No. 497,677

Claims priority, application France Apr. 30, 1954

14 Claims. (Cl. 340—174.1)

The present invention relates to improvements in or relating to the design and control of magnetic recording and/or playback heads forming part of a magnetic signal recorder of the kind wherein a plurality of recording tracks cooperate with at least one corresponding plurality of magnetic heads to record on and read from the track-bearing magnetic medium and also to assist in the selection of these tracks. A typical device of this kind is the well-known magnetic drum recorder which is used in electric digital computers for storage and playback of the high frequence pulse coded trains representing the number-words and instruction-words.

In a magnetic drum storage unit of this kind, at least one plurality of magnetic heads are arranged along a generatrix of the rotating cylinder in close proximity of the magnetic film applied thereon. Recording and playback heads may be provided spaced at different places of each track, but, most frequently, a recording head and a playback head are incorporated in a single unitary structure forming a combined record/playback head. To this end, a pair of pole pieces are mounted on opposite sides of a single armature piece, each pole piece bearing a signal coil. Two adjacent air-gaps are created between the tips of armature and pole pieces, and the magnetic head is so mounted with respect to the drum that for playback and recording respectively, as the drum rotates these air-gaps appear in succession in front of the tracks concerned. By omission of one of these pole pieces, a single air-gap head may be obtained, and the present invention is concerned with single air-gap heads as well as twin air-gap heads of this type.

Usually, any signal to be recorded on a definite track, first appears in a transmission channel which is common to all the recording coils. Any coil of a plurality can be reached by this signal according to the condition of routing arrangement inserted between the common channel and these coils. Each coil is connected to one distinct output of the routing arrangement and the routing is controlled by selection signals applied to appropriate inputs of the routing arrangement other than the common input connected to the common signal channel. Each particular selection signal activates a particular output of this routing arrangement. It results in the application of the routed signal to the particular magnetic recording head connected to this particular output. Conversely the playback coils are respectively connected to separate inputs of a playback routing arrangement leading to a single common playback signal transmission channel. Each particular playback selection signal activates a corresponding particular input of this routing arrangement. This is a simplified scheme of the previously known arrangements where such routing arrangements were often provided with several routing stages and actuated from a corresponding set of selection signals. It will be sufficient here to point out that, in the prior art, no selective routing control was contemplated through a modification of the conditions of the magnetic circuits proper of the record and/or playback heads.

In contrast thereto, the present invention has for its general object a design of a record and/or playback magnetic head of the above specified kind in which an efficient control of its transfer characteristic can be insured from a change of condition of its magnetic circuit proper. This results in simplifying the selective process of operating the heads of a magnetic drum storage unit as will be explained further below.

Another object of the invention is to provide a magnetic head with an armature or armature portion, part of which is clamped between the end portions of a U-shaped magnet extending transversely thereto and bearing around its bend a control coil adapted to receive a D.C. current for saturation or de-saturation of the armature portion.

As long as the armature portion of the head is maintained in the saturated condition, the head is disabled either for recording or for playing back, or both when so designed. As soon as the armature piece is de-saturated, the magnetic head recovers its complete efficiency therefor.

Reference will now be made to the accompanying drawings wherein.

These examples refer to combined record/playback heads. Obviously the invention can be applied to either record heads or playback magnetic heads, without departing from the scope of this disclosure.

Figure 1:
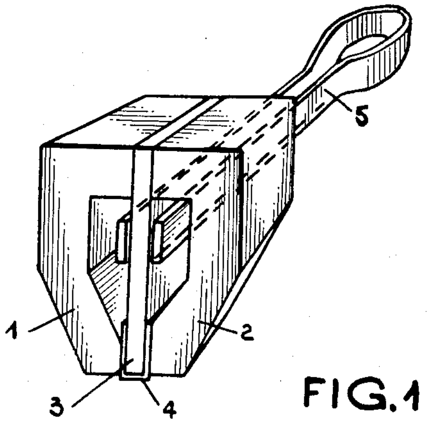
Fig. 1 shows a schematic embodiment of the magnetic circuits of a magnetic record/playback combination head according to the invention.

The combined record/playback head shown in Fig. 1 comprises two pole pieces 1 and 2 associated with an armature piece 3. The armature piece may consist of so-called "mu-metal" material. The pole pieces may consist of so-called "ferrite" material. A spacer 4, consisting, for instance, of paper, may be provided for establishing the two air-gaps between the respective tips of armature piece 3 and pole pieces 1 and 2 respectively. These component parts of a record/playback head, and their assembly, are now quite conventional.

Figure 3:
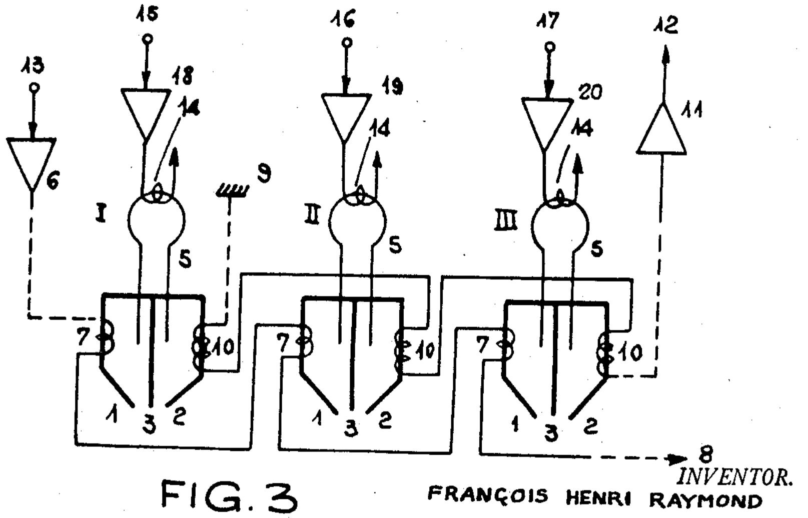
Fig. 3 shows a circuit diagram for interconnection and control of a set of magnetic record/playback heads, each one designed in accordance with the present invention.

In the more schematic representation of the magnetic heads in Fig. 3, the record coil is shown at 7 around pole piece 1, and the playback coil is shown at 10 around pole piece 2.

The actual magnetic recording medium is not shown in the drawing because it has no bearing on the present invention.

A portion of armature piece 3 is clamped between the end portions of a magnetic piece 5. Preferably the front faces of these end portions register with the front face of armature piece 3. At the rear, the U-piece 5 is enlarged so that a control coil can be arranged around its bend. This coil is shown at 14 around each piece 5 of the three magnetic heads I, II and III. Apparently the U-piece 5 is shown to extend transversely with respect to the direction of the armature 3, forming a right angle therewith.

Figure 2:
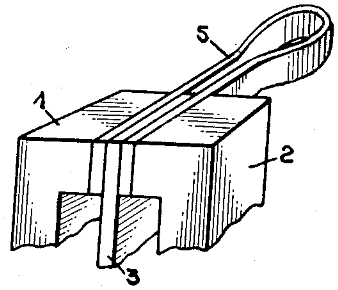
Fig. 2 shows a schematic embodiment of a modified portion of the magnetic head.

In the alternative embodiment shown in Fig. 2 the end portions of U-piece 5 still clamp the armature 3 but at the same time are inserted between the end portion of armature 3 and respective end faces of pole pieces 1 and 2. Preferably in this case, the cross sections of the end faces of the said pole pieces 1 and 2 and the surfaces of the end portions of U-piece 5 cooperating therewith, are made substantially equal.

U-piece 5 may be made of the above-mentioned mu-metal.

In either embodiment, when no D.C. current flows through the control winding 14, the insertion or addition of the U-piece 5 does not substantially change the usual operation of the magnetic head. When a signal is applied to record coil 7, this signal will efficiently control the magnetization of the circuit 1—3, and as a result this signal will be transferred to the magnetic recording medium cooperating with the air-gap between the armature pieces 1 and 3. When the record carrier presents a recorded signal under the air-gap 2—3 of the head, the magnetization will correspondingly vary in circuit 2—3 and a play-back signal will appear in playback coil 10 of the head.

When a D.C. current, of suitable magnitude, flows through control winding 14 of a magnetic head designed in accordance with the present invention, a transverse magnetic field is created within the magnetic circuit including U-piece 5 and that part of armature piece 3 which is clamped between the end portions of U-piece 5. This transversal field can be adjusted to such a magnitude that armature piece 3 becomes saturated. As a result, the reluctance of armature piece 3 with respect to magnetic circuits 1—3 and 2—3 will be so increased as to simulate an important air-gap in these circuits which are consequently interrupted. Any signal circuit passing through record coil 7 during a time when the armature piece is saturated cannot create any change in the magnetic condition of circuit 1—3; such a signal will not be transferred to the magnetic recording medium. Conversely, a change in the magnetic state of the record medium under air-gap 2—3 when the armature piece is saturated and such a recorded signal cannot be played back through coil 10.

It may be said that a magnetic head according to the invention is controlled from a magnetic switch which itself is controlled from an electrical switch.

In the embodiment of Fig. 2, the magnitude of the D.C. current insuring saturation of the armature will be lower than the magnitude of the same current required for the same purpose in the embodiment of Fig. 1.

In case a plurality of magnetic heads according to the invention are associated with respect to a common magnetic record medium such as a magnetic storage drum, the record coils thereof may be serially connected, as shown in Fig. 3, and inserted in the plate-to-bias connection of the output stage of an input amplifier 6. For instance, point 8 may be connected to the ground of this last stage of amplifier 6 consists of a pentode which has its cathode supplied with a high negative battery potential. Similarly, playback coils 10 may be serially connected from ground 9 to the input of an output amplifier 11. The signals to be recorded are applied at 13 and consist, as known of substantially rectangular waveform voltages which have been previously time-modulated. The output signals at 12 will consist of signals of similar waveform.

In the overall rest condition of this arrangement, all the D.C. supplies, 18, 19 and 20, for the respective control coils 14 of the magnetic heads I, II and III, are operative. Consequently a saturation of D.C. current flows in each of coils 14. All the heads are unoperative.

The selective control for recording and/or playing back is achieved by means of selection signals which are applied to inputs 15, 16 and 17 of the respective current sources 18, 19 and 20. Only one of these signals is applied at the time a selection is to be operated. Its application will suppress the current through the corresponding coil 14, and as a result will de-saturate the corresponding magnetic head. This head will then be responsive to an input signal, if any, or a previously recorded signal, if any. Control of a reverse character can be used if necessary, whereby all the heads are operative until a set of D.C. current activation signals is applied to the pre-selected inputs of current sources 18, 19 and 20.

The manner in which these control signals are obtained is believed to be outside the scope of the present disclosure.

I claim:

1. In combination, at least two generally U-shaped pole structures, one including A.C. controlled means for producing selectively writing and reading magnetic flux, the other including D.C. controlled means for producing selectively saturation magnetic flux; said first pole structure having several elongated arms extending from a common base and terminating in at least two pole ends facing each other; and said other pole structure terminating into two further pole ends facing each other and having arranged therebetween a portion of one of said arms of said first pole structure so as to permit said A.C. and D.C. fluxes to traverse said arm substantially in the same direction relative to the longitudinal extension of said arm.

2. A system according to claim 1, wherein said other pole structure consists of a U-piece clamping said arm.

3. A system according to claim 1, wherein said other pole structure consists of a U-piece clamping said one arm; said first pole structure including a third arm extending from said base, the pole ends of said other pole structure being clamped between said one and third arms of said first pole structure.

4. A system according to claim 1, wherein said first pole structure includes three arms one of said arms being magnetically conductively connected to the other two arms at one end thereof and forms separate gaps with said other two arms at the other end thereof; said other pole structure consisting of a U-piece clamping one of said arms.

5. A system according to claim 1, wherein said first pole structure includes three arms and wherein one of said arms is magnetically connected to the two arms at one end thereof, and forms separate gaps with said two arms at the other end thereof; said other pole structure consisting of a U-piece clamping said one arm, and clamped between the first ends of said two other arms; each of said two other arms being provided with separate windings for writing and reading respectively, and said U-piece being provided with a control winding.

6. In combination, a number of systems according to claim 5, each system comprising in its first pole structure writing and reading windings, and its other pole structure control windings; said writing and reading windings being connected in series respectively; there being provided single current sources modulated by writing and reading signals, and connected to the series connections of said writing and reading windings respectively, and signal controlled means for operating the control windings selectively to insure any possible selection of first pole structures for both writing of and reading of the signal.

7. In a magnetic record storage system, a record medium and a number of magnetic heads cooperating with said record medium and permitting at least one of several operations including record writing and reading, each of said heads comprising one pole structure provided with at least one winding and an elongated armature magnetically conductively connected to said pole structure at one end thereof and forming at least one gap with said pole structure at another end thereof; and another pole structure forming another gap substantially parallel to said first gap; and provided with a control winding; said armature extending through said other gap; and means for selectively supplying direct current to selected ones of said control windings for saturating the associated armatures and thereby disabling the associated magnetic heads.

8. A system according to claim 7 comprising in each of said first pole structures writing and reading windings; a writing current source comprising a writing input amplifier having a signal input and a signal output, a serial connection from said output to a biassing point through each of the writing windings, and reading control means comprising a reading output amplifier having a signal input, a serial connection from a biassing point and each of said reading windings to the input of the said reading output amplifier, and means for selectively operating said magnetic heads comprising a plurality of D.C. sources, each having a separate control signal input and a signal output and a serial connection from said control signal output to a biassing point through one of said control windings.

9. System according to claim 8 wherein said other pole structure includes at least one magnetic U-piece extending in a direction substantially perpendicular to the plane of the first pole structure, the end portions of the said U-piece clamping therebetween a part of said armature and the bend of the said U-shaped piece bearing a D.C. control winding for controlling through said U-piece saturation and de-saturation of the armature.

10. System according to claim 9 wherein that part of the armature which is clamped between the end portions of the said U-piece is located between the tip of the armature forming the gap with the tip of the pole piece, and the other end of the armature which is magnetically conductively connected to the other end of said pole piece substantially without any gap.

11. System according to claim 9 wherein that part of the armature which is clamped between the end portions of the said U-piece is the end part of the armature magnetically conductively connected to the end portion of the pole pieces substantially without any gap, one end portion of the said U-piece being subsequently inserted in the magnetic circuit formed by armature and pole piece substantially without any gap therebetween.

12. In an apparatus for performing at least one of several operations including the producing and reproducing of magnetic flux variations, a plurality of magnetic structures each including at least two branches separated by a gap; one branch being of higher saturability than the other and having energizing means arranged thereon to produce flux variations passing through said gap; and a plurality of other magnetic structures each having a gap substantially parallel to the first gap; each branch of lower saturability being magnetically connected to one of said other magnetic structures through the gap of said other structure, and means in each of said other magnetic structure for selectively saturating selected ones of said lower saturability branches to permit the energizing means associated therewith to become inoperative.

13. System according to claim 12 wherein said other magnetic structure extends in a direction substantially perpendicular to the plane of said first magnetic structure.

14. System according to claim 12 wherein each of said first magnetic structures consists of three branches, two of said branches being of higher saturability than the third branch and being separated from said third branch by two parallel gaps; said other magnetic structure extending in a direction substantially perpendicular to the plane of said first magnetic structure and being magnetically conductively connected across said third branch as well as across said two first branches.

References Cited in the file of this patent

UNITED STATES PATENTS

| | | |
|---|---|---|
| 2,730,694 | Williamson | Jan. 10, 1956 |
| 2,734,941 | Zenel | Feb. 14, 1956 |
| 2,740,110 | Trimble | Mar. 27, 1956 |
| 2,786,897 | Schwarz | Mar. 26, 1957 |

FOREIGN PATENTS

| | | |
|---|---|---|
| 877,208 | Germany | May 21, 1953 |